US009389766B2

(12) United States Patent
Takeda

(10) Patent No.: US 9,389,766 B2
(45) Date of Patent: Jul. 12, 2016

(54) IMAGE DISPLAY DEVICE, IMAGE DISPLAY METHOD, IMAGE DISPLAY PROGRAM, AND COMPUTER-READABLE RECORDING MEDIUM FOR PROVIDING ZOOM FUNCTIONALITY

(75) Inventor: Seiichi Takeda, Shinagawa-ku (JP)

(73) Assignee: Rakuten, Inc., Tokyo (JP)

(*) Notice: Subject to any disclaimer, the term of this patent is extended or adjusted under 35 U.S.C. 154(b) by 110 days.

(21) Appl. No.: 14/131,761

(22) PCT Filed: Apr. 5, 2012

(86) PCT No.: PCT/JP2012/059402
§ 371 (c)(1),
(2), (4) Date: Jan. 9, 2014

(87) PCT Pub. No.: WO2013/027441
PCT Pub. Date: Feb. 28, 2013

(65) Prior Publication Data
US 2014/0152702 A1 Jun. 5, 2014

(30) Foreign Application Priority Data
Aug. 22, 2011 (JP) ................. 2011-180831

(51) Int. Cl.
*G06F 3/041* (2006.01)
*G06F 3/0484* (2013.01)
(Continued)

(52) U.S. Cl.
CPC .......... *G06F 3/04845* (2013.01); *G06F 3/0484* (2013.01); *G06F 3/04883* (2013.01); *G06T 3/40* (2013.01); *G06F 2203/04806* (2013.01)

(58) Field of Classification Search
CPC .................... G06F 3/041; G09G 5/00
See application file for complete search history.

(56) References Cited

U.S. PATENT DOCUMENTS 6,054,990 A * 4/2000 Tran ................ G06F 3/0488
345/179
2009/0135275 A1* 5/2009 Imata ................ H04N 5/23203
348/240.99

(Continued)

FOREIGN PATENT DOCUMENTS

JP 2001-66985 A 3/2001
JP 2004-028678 A 1/2004
(Continued)

OTHER PUBLICATIONS

"Google Map", searched on Jul. 20, 2011, Internet, http://maps.google.com.
(Continued)

*Primary Examiner* — Ming Hon
*Assistant Examiner* — Phong Nguyen
(74) *Attorney, Agent, or Firm* — Sughrue Mion, PLLC

(57) ABSTRACT

An image display device includes an acquisition unit that, when an operation of enclosing an arbitrary region on a display screen is performed in response to sequential instruction inputs by a user, acquires position information indicating positions indicated by those instruction inputs, a recognition unit that specifies an enclosed region by a trajectory of the acquired position information and recognizes the enclosed region as a selected region, a determination unit that determines to zoom in an image displayed in an image display area with a zoom-in ratio determined based on the range of the selected region and the range of the image display area, and a display control unit that displays a zoomed-in transformed image with the determined zoom-in ratio in the display area with the center of the transformed image and the center of the image display area aligned.

9 Claims, 14 Drawing Sheets (a)

(b)

(51) Int. Cl.
  *G06F 3/0488* (2013.01)
  *G06T 3/40* (2006.01)

(56) References Cited

U.S. PATENT DOCUMENTS

| | | | | |
|---|---|---|---|---|
| 2009/0219290 A1* | 9/2009 | Kakie | G06F 3/03545 | 345/427 |
| 2010/0315438 A1* | 12/2010 | Horodezky et al. | | 345/661 |
| 2011/0080430 A1* | 4/2011 | Nishibe | G06F 3/04883 | 345/661 |
| 2011/0109581 A1* | 5/2011 | Ozawa et al. | | 345/173 |
| 2012/0311489 A1* | 12/2012 | Williams | G06F 3/04883 | 715/800 |

FOREIGN PATENT DOCUMENTS

| | | | |
|---|---|---|---|
| JP | 2010-271774 A | 12/2010 |
| JP | 2011-81440 A | 4/2011 |

OTHER PUBLICATIONS

International Search Report for PCT/JP2012/059402 dated May 15, 2012.

JP Office Action for JP 2011-180831 dated Feb. 12, 2013.

Translation of International Preliminary Report on Patentability dated Mar. 6, 2014 issued in Application No. PCT/JP2012/059402.

* cited by examiner

*Fig.3*

| POSITION INFORMATION | COORDINATE VALUE | ACQUISITION TIME |
|---|---|---|
| ⋮ | ⋮ | ⋮ |
| $P_1$ | $(X_1, Y_1)$ | $t_1$ |
| $P_2$ | $(X_2, Y_2)$ | $t_2$ |
| $P_3$ | $(X_3, Y_3)$ | $t_3$ |
| $P_4$ | $(X_4, Y_4)$ | $t_4$ |
| $P_5$ | $(X_5, Y_5)$ | $t_5$ |
| $P_6$ | $(X_6, Y_6)$ | $t_6$ |
| $P_7$ | $(X_7, Y_7)$ | $t_7$ |
| ⋮ | ⋮ | ⋮ |

IMAGE DISPLAY DEVICE, IMAGE DISPLAY METHOD, IMAGE DISPLAY PROGRAM, AND COMPUTER-READABLE RECORDING MEDIUM FOR PROVIDING ZOOM FUNCTIONALITY

CROSS REFERENCE TO RELATED APPLICATIONS

This application is a National Stage International Application No. PCT/JP2012/059402 filed Apr. 5, 2015, claiming priority based on Japanese Patent Application No. 2011-180831 filed Aug. 22, 2011, the contents of all of witch are incorporated herein by reference in their entirety.

TECHNICAL FIELD

The present invention relates to an image display device, an image display method, an image display program, and a computer-readable recording medium whereon the program is recorded.

BACKGROUND ART

There has been a device for displaying images where, when a rectangular area is input on an image through an input device, the selected area is zoomed in. For example, in Non Patent Literature 1 below, the "drag and zoom" feature is provided at the display of a map. According to this feature, when a user drags a mouse on a map, the area enclosed in a rectangle with a diagonal line along the pointer drag path is displayed zoomed in.

CITATION LIST

Non Patent Literature

NPL: "Google map" [Online] [Searched on Jul. 20, 2011] Internet <URL: http://maps.google.com/maps?showlabs=1>

SUMMARY OF INVENTION

Technical Problem

In the above-described related art, a rectangle that is specified by a drag operation is displayed during the drag operation in order to allow a user to intuitively recognize a selected range while the user is selecting an area to be zoomed in. However, because a rectangle based on the path of the drag is calculated and displayed each time the coordinates of the pointer are moved in order to display the rectangle during the drag operation, a heavy processing load has been imposed on a device.

In view of the foregoing, an object of the present invention is to provide an image display device, an image display method, an image display program, and a computer-readable recording medium whereon the program is recorded that can provide a user interface capable of intuitively selecting an area to be zoomed with a light processing load.

Solution to Problem

To solve the above problem, an image display device according to one aspect of the present invention is an image display device including a display means configured to display an image in an image display area on a display screen and an input means configured to receive an instruction input indicating a position on the display screen, device including an acquisition means configured to acquire position information indicating a position of an instruction input received by the input means, a region recognition means configured to specify an enclosed region in the image display area enclosed by a trajectory indicated by a set of position information received by the acquisition means based on sequential instruction inputs through the input means and recognize the enclosed region as a selected region, a determination means configured to determine a zoom-in ratio of an image displayed in the image display area based on a range of the image display area and a range of the selected region recognized by the region recognition means, and a display control means configured to cause a zoomed-in image obtained by zooming in the image displayed in the image display area with the zoom-in ratio determined by the determination means to be displayed in the image display area with a center of the zoomed-in image and a center of the image display area coinciding with each other.

An image display method according to one aspect of the present invention is an image display method in an image display device including a display means configured to display an image in an image display area on a display screen and an input means configured to receive an instruction input indicating a position on the display screen, the method including an acquisition step of acquiring position information indicating a position of an instruction input received by the input means, a region recognition step of specifying an enclosed region in the image display area enclosed by a trajectory indicated by a set of position information received in the acquisition step based on sequential instruction inputs through the input means and recognizing the enclosed region as a selected region, a determination step of determining a zoom-in ratio of an image displayed in the image display area based on a range of the image display area and a range of the selected region recognized in the region recognition step, and a display control step of causing a zoomed-in image obtained by zooming in the image displayed in the image display area with the zoom-in ratio determined in the determination step to be displayed in the image display area with a center of the zoomed-in image and a center of the image display area coinciding with each other.

An image display program according to one aspect of the present invention is an image display program causing a computer to function as an image display device including a display means configured to display an image in an image display area on a display screen and an input means configured to receive an instruction input indicating a position on the display screen, the program causing the computer to implement an acquisition function to acquire position information indicating a position of an instruction input received by the input means, a region recognition function to specify an enclosed region in the image display area enclosed by a trajectory indicated by a set of position information received by the acquisition function based on sequential instruction inputs through the input means and recognize the enclosed region as a selected region, a determination function to determine a zoom-in ratio of an image displayed in the image display area based on a range of the image display area and a range of the selected region recognized by the region recognition function, and a display control function to cause a zoomed-in image obtained by zooming in the image displayed in the image display area with the zoom-in ratio determined by the determination function to be displayed in the image display area with a center of the zoomed-in image and a center of the image display area coinciding with each other.

A computer-readable recording medium according to one aspect of the present invention is a computer-readable recording medium storing an image display program causing a computer to function as an image display device including a display means configured to display an image in an image display area on a display screen and an input means configured to receive an instruction input indicating a position on the display screen, the image display program causing the computer to implement an acquisition function to acquire position information indicating a position of an instruction input received by the input means, a region recognition function to specify an enclosed region in the image display area enclosed by a trajectory indicated by a set of position information received by the acquisition function based on sequential instruction inputs through the input means and recognize the enclosed region as a selected region, a determination function to determine a zoom-in ratio of an image displayed in the image display area based on a range of the image display area and a range of the selected region recognized by the region recognition function, and a display control function to cause a zoomed-in image obtained by zooming in the image displayed in the image display area with the zoom-in ratio determined by the determination function to be displayed in the image display area with a center of the zoomed-in image and a center of the image display area coinciding with each other.

According to the above aspect, when, in response to sequential instruction inputs by a user, an operation of enclosing an arbitrary region on a display screen with the trajectory of positions indicated by those instruction inputs is performed, a set of position information representing the positions indicated by those instruction inputs are obtained. Then, an enclosed region that is specified by the trajectory of the acquired set of position information is recognized as a selected region, and an image displayed in an image display area is zoomed in with the zoom-in ratio that is determined based on the range of the selected region and the range of the image display area. Further, the zoomed-in image is displayed with the center of the zoomed-in image and the center of the image display area aligned with each other. Thus, because the image is zoomed in based on a user's operation of enclosing an arbitrary region on the display screen, the area to be zoomed in within the image can be selected in an intuitive manner. Further, because processing that is performed during receiving instruction inputs is only the processing of acquiring position information and thus sequential heavy-load computation is not required, a zoom-in display process can be achieved with a light processing load.

The image display device according to another aspect may further include a direction specifying means configured to specify a direction of the trajectory enclosing the enclosed region based on the trajectory of the position information received by the acquisition means, and the determination means may determine the zoom-in ratio when the direction specified by the direction specifying means is a first direction.

According to the above aspect, an instruction input for zooming in an image is easily distinguishable. Therefore, a user can easily zoom in the image.

In the image display device according to another aspect, the determination means may determine a zoom-out ratio of an image displayed in the image display area based on a range of the image display area and a range of the selected region recognized by the region recognition means when the direction specified by the direction specifying means is a second direction opposite to the first direction, and the display control means may cause a zoomed-out image obtained by zooming out an image at least partly including the image displayed in the image display area with the zoom-out ratio determined by the determination means to be displayed in the image display area with a center of the zoomed-out image and a center of the image display area coinciding with each other.

According to the above aspect, the zoom-out ratio and the display position of the zoomed-out image are determined based on a user's operation of enclosing an arbitrary region on the display screen, the user can perform input for zooming out by an intuitive operation.

In the image display device according to another aspect, the determination means may determine a largest zoom-in ratio allowing display of a whole image within a rectangular region circumscribing the selected region in the image display area as the zoom-in ratio of the image displayed in the image display area, and the display control means may cause the image included in the rectangular region to be zoomed in with the zoom-in ratio determined by the determination means and displayed in the image display area.

According to the above aspect, the range of an image which a user desires to zoom in is appropriately set by a rectangular region, and the image can be zoomed in to the largest scale in the image display area and provided to the user.

In the image display device according to another aspect, the position information may be represented by first and second coordinate values in a two-dimensional coordinate system having first and second coordinate axes orthogonal to each other in the image display area, and the determination means may calculate a difference value between the maximum first coordinate value and the minimum first coordinate value among a plurality of first coordinate values respectively included in a plurality of position information forming an outer edge of the selected region as a size of the selected region in a direction of the first coordinate axis, calculate a difference value between the maximum second coordinate value and the minimum second coordinate value among a plurality of second coordinate values as a size of the selected region in a direction of the second coordinate axis, and determine the zoom-in ratio based on a ratio of a size of the image display area in the direction of the first coordinate axis to the size of the selected region in the direction of the first coordinate axis or a ratio of a size of the image display area in the direction of the second coordinate axis to the size of the selected region in the direction of the second coordinate axis.

According to the above aspect, the zoom-in ratio is set based on the ratio of the size of the image display area to the size of the selected region in the direction of either one of the first or second coordinate axis, and therefore the image included in the selected region can be zoomed in with the more appropriate zoom-in ratio.

In the image display device according to another aspect, the determination means may determine a zoom-out ratio allowing display of the image displayed in the image display area within a rectangular region circumscribing the selected region as the zoom-out ratio of the image displayed in the image display area, and the display control means may cause an image at least partly including the image displayed in the image display area to be zoomed out with the zoom-out ratio determined by the determination means and displayed within the rectangular region in the image display area.

According to the above aspect, the zoom-out ratio is determined so that the image displayed in the image display area falls within the rectangular region circumscribing the selected region. Therefore, the image displayed in the image display area can be appropriately zoomed out.

In the image display device according to another aspect, the position information may be represented by first and second coordinate values in a two-dimensional coordinate system having first and second coordinate axes orthogonal to each other in the image display area, and the determination means may calculate a difference value between the maximum first coordinate value and the minimum first coordinate value among a plurality of first coordinate values respectively included in a plurality of position information forming an outer edge of the selected region as a size of the selected region in a direction of the first coordinate axis, calculate a difference value between the maximum second coordinate value and the minimum second coordinate value among a plurality of second coordinate values as a size of the selected region in a direction of the second coordinate axis, and determine the zoom-out ratio based on a ratio of the size of the selected region in the direction of the first coordinate axis to a size of the image display area in the direction of the first coordinate axis or a ratio of the size of the selected region in the direction of the second coordinate axis to a size of the image display area in the direction of the second coordinate axis.

According to the above aspect, the zoom-out ratio is set based on the ratio of the size of the selected region to the size of the image display area in the direction of either one of the first or second coordinate axis, and therefore the image displayed in the image display area can be zoomed out with the more appropriate zoom-out ratio.

In the image display device according to another aspect, when position information based on sequential instruction inputs is additionally acquired by the acquisition means after specifying the enclosed region by the trajectory of the position information, the region recognition means may acquire a trajectory of the position information received after specifying the enclosed region, and the determination means may adjust the zoom-in ratio or the zoom-out ratio of the image displayed in the image display area based on a position and a length of the trajectory of the position information received after specifying the enclosed region acquired by the region recognition means.

According to the above aspect, the zoom-in ratio or the zoom-out ratio of the image is adjusted when a user performs an operation of enclosing an arbitrary region in the image display area with the trajectory of positions indicated by instruction inputs and then further performs an operation of sequential instruction inputs, and therefore the user can easily adjust the zoom-in ratio or the zoom-out ratio of the image by a series of operations following the operation of enclosing an arbitrary region.

In the image display device according to another aspect, when the trajectory of the position information received after specifying the enclosed region extends inside the enclosed region, the determination means may adjust the zoom-in ratio or the zoom-out ratio of the image displayed in the image display area by making a change being one of an increase and a decrease to the ratio, and when the trajectory of the position information received after specifying the enclosed region extends outside the enclosed region, the determination means may adjust the zoom-in ratio or the zoom-out ratio of the image displayed in the image display area by making a change being another one of an increase and a decrease to the ratio.

According to the above aspect, the adjustment for further increasing or decreasing the zoom-in ratio or the zoom-out ratio of the image can be easily made.

In the image display device according to another aspect, when one or more enclosed regions are additionally specified by the trajectory of the position information received after specifying the enclosed region, the determination means may change the zoom-in ratio or the zoom-out ratio of the image displayed in the image display area in accordance with the number of additionally specified enclosed regions.

According to the above aspect, the zoom-in ratio or the zoom-out ratio of the image displayed in the image display area can be changed in more detail.

In the image display device according to another aspect, when a moving speed of the position of the instruction input received by the input means is a specified speed or higher, the determination means may determine to zoom in or out the image displayed in the image display area.

According to the above aspect, sequential instruction inputs for zooming in or out an image and sequential instruction inputs for performing the other processing are easily distinguishable, and therefore a user can easily make instruction inputs for zooming in or out an image.

Advantageous Effects of Invention

According to the present invention, it is possible to display an image zoomed in and out, allowing a user to intuitively recognize the detail of zoom in and out of the image with a light processing load.

BRIEF DESCRIPTION OF DRAWINGS

FIG. 3 is a diagram showing an example of position information acquired by an acquisition unit.

DESCRIPTION OF EMBODIMENTS

An embodiment of the present invention is described hereinafter in detail with reference to the appended drawings. Note that, in the description of the drawings, the same or equivalent elements are denoted by the same reference symbols, and the redundant explanation thereof is omitted.

Figure 1:
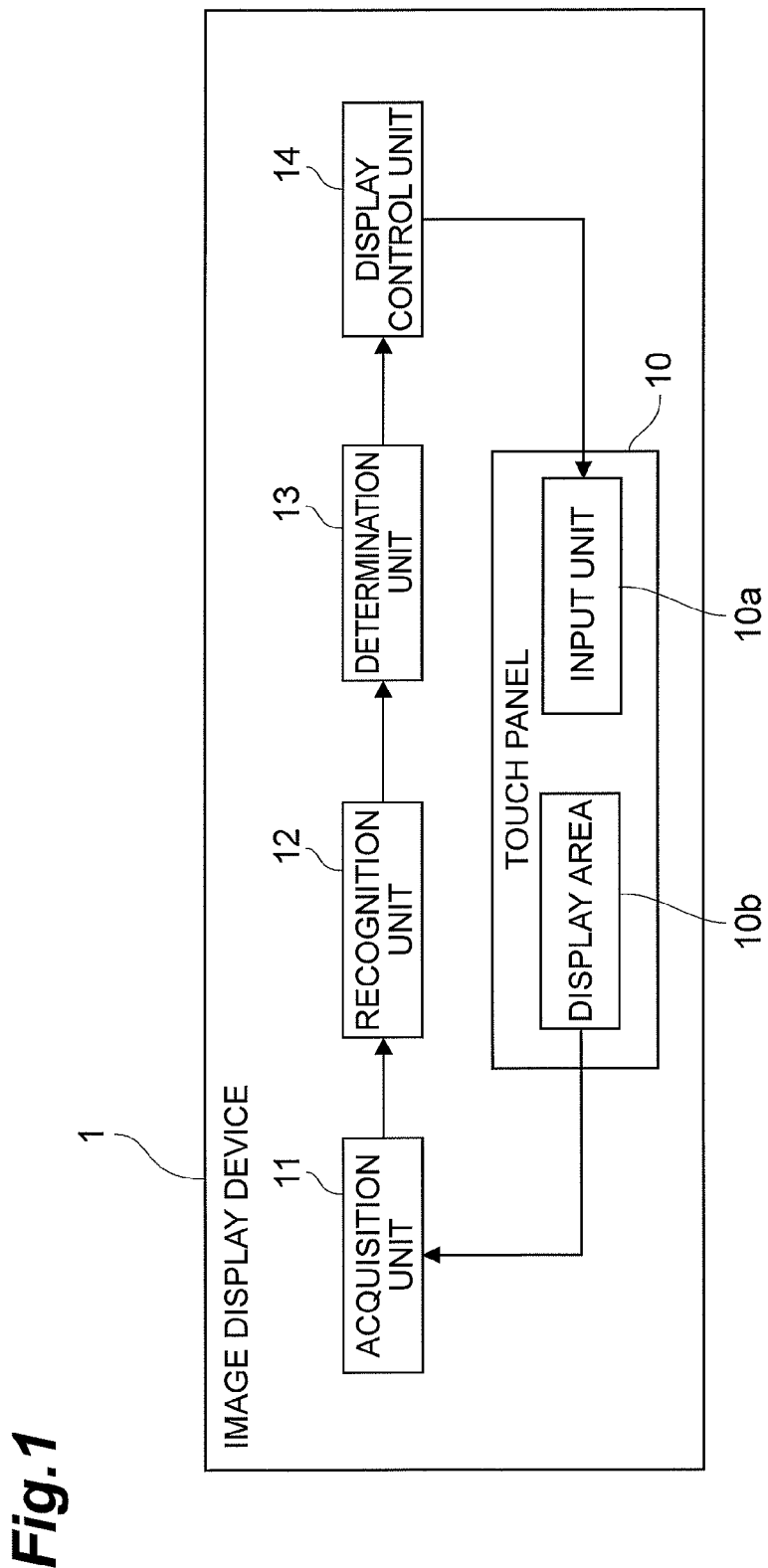
FIG. 1 is a block diagram showing a functional configuration of an image display device.

FIG. 1 is a block diagram showing a functional configuration of an image display device 1 according to this embodiment. The image display device 1 is a device that includes a display means that displays an image in an image display area on a display screen and an input means that receives an instruction input indicating a position on the display screen. The image display device 1 is a terminal having a so-called touch panel, for example. The touch panel displays an image on a display screen and is provided with an input means that detects physical contact on the display screen and can thereby output information indicating a position at which physical contact on the display screen is detected.

Further, the image display device 1 may be a personal computer that includes a display and a pointing device, for example. The display displays an image on a display screen, and the pointing device can receive an instruction input indicating a position on the display screen.

A user uses the pointing device to make an instruction input indicating an arbitrary position of an image that is displayed on the display screen.

The image display device 1 according to this embodiment is described hereinafter using the example of the terminal having the touch panel. As shown in FIG. 1, the image display device 1 functionally includes a touch panel 10, an acquisition unit 11 (acquisition means), a recognition unit 12 (region recognition means, direction specifying means), a determination unit 13 (determination means), and a display control unit 14 (display control means).

Figure 2:
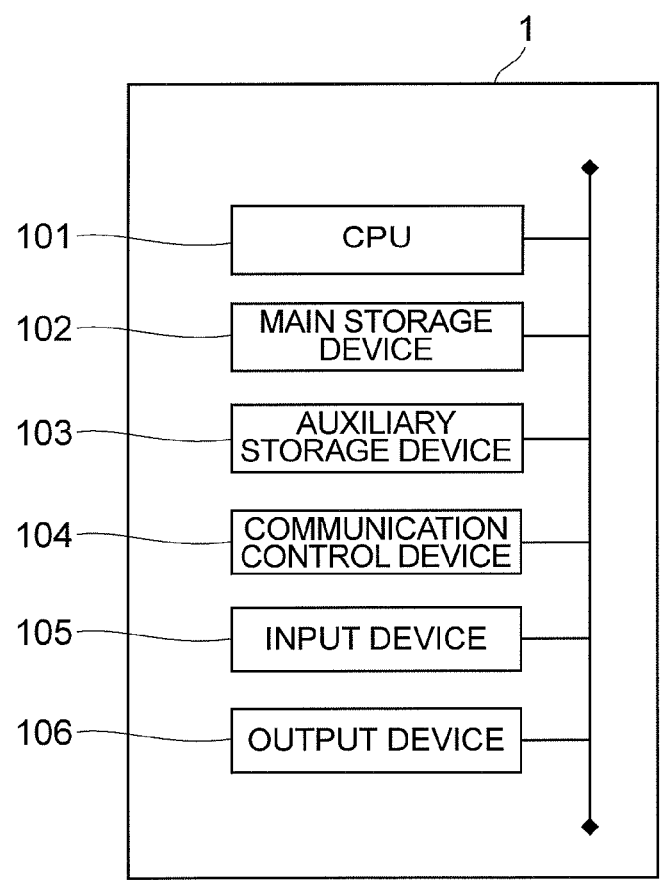
FIG. 2 is a diagram showing a hardware configuration of an image display device.

FIG. 2 is a hardware configuration diagram of the image display device 1. As shown in FIG. 2, the image display device 1 is physically configured as a computer system that includes a CPU 101, a main storage device 102 such as memory like RAM and ROM, an auxiliary storage device 103 such as a hard disk, a communication control device 104 such as a network card, an input device 105 such as a keyboard and a mouse, an output device 106 such as a display and the like.

The functions shown in FIG. 1 are implemented by loading given computer software (image display program) onto hardware such as the CPU 101 or the main storage device 102 shown in FIG. 2, making the communication control device 104, the input device 105 and the output device 106 operate under control of the CPU 101, and performing reading and writing of data in the main storage device 102 or the auxiliary storage device 103. Data and database required for the processing is stored in the main storage device 102 or the auxiliary storage device 103.

The touch panel 10 includes a display area 10*a* (image display area) and an input unit 10*b* (input means). The display area 10*a* is an area that constitutes a display screen that displays an image, and it displays an image under control of the display control unit 14. The input unit 10*b* is a part that receives an instruction input indicating a position in the display area 10*a*.

The acquisition unit 11 is a part that acquires position information indicating a position of the instruction input received by the input unit 10*b*. FIG. 3 is a diagram showing an example of position information acquired by the acquisition unit 11. As shown in FIG. 3, position information P includes a coordinate value indicating a position in the display area 10*a* and time when the position information is acquired. The x-axis and the y-axis in the coordinate system in the position information P are respectively set to the crosswise direction and the lengthwise direction when the image display device 1 is in the state where a normal operation by a user is performed thereon, for example.

Further, when sequential instruction inputs are received through the input unit 10*b*, the acquisition unit 11 acquires a plurality of position information $P_1$ to $P_7$ in time-series fashion as shown in FIG. 3, for example. An example of the sequential instruction inputs is a user's operation of drawing a circle on the touch panel, for example. When the sequential instruction inputs are received by the input unit 10*b*, the acquisition unit 11 acquires a set of time-series position information made up of a plurality of position information acquired at every specified time. The interval of the specified time when the position information is acquired is previously set in a system that controls the image display device 1, and it is 1/60 second, for example. The acquisition unit 11 outputs the acquired position information P to the recognition unit 12.

The recognition unit 12 is a part that specifies an enclosed region on the basis of the trajectory of a set of time-series position information received by the acquisition unit 11 based on the sequential instruction inputs through the input unit 10 and recognizes the enclosed region as a selected region. To be specific, when a closed region is formed by the trajectory of position information, the recognition unit 12 can recognize the closed region as the enclosed region. Alternatively, even if a closed region is not formed by the trajectory of position information, the recognition unit 12 can specify the enclosed region when the trajectory of position information satisfies specified conditions, as described later with reference to FIG. 8.

Figure 4:
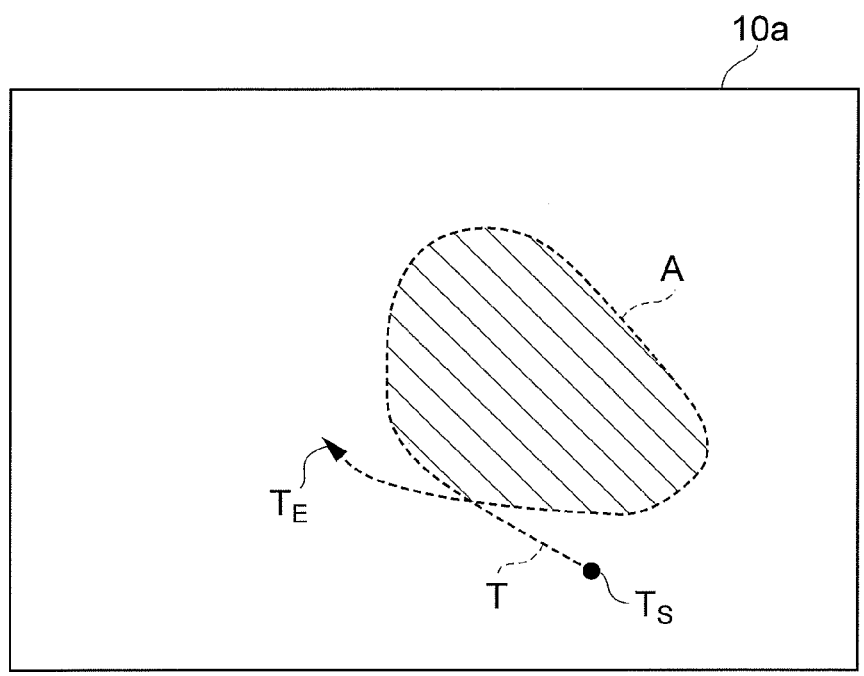
FIG. 4 is a diagram schematically showing the trajectory of position information in a display area of a touch panel.

When the enclosed region is specified by the trajectory of the position information, the recognition unit 12 recognizes the enclosed region as a selected region. An example of recognition of a selected region by the recognition unit 12 is described with reference to FIG. 4. FIG. 4 is a diagram schematically showing the trajectory T of position information in the display area 10*a* of the touch panel 10. In the example shown in FIG. 4, the trajectory T of position information extends from the starting point $T_S$ to the end point $T_E$. Further, the trajectory T has an intersection at some point between the starting point $T_S$ and the end point $T_E$, and thereby a diagonally shaded closed region is formed by the trajectory T of position information. When the closed region is formed by the trajectory T of position information as shown in FIG. 4, the recognition unit 12 specifies the closed region as the enclosed region and recognizes the enclosed region as a selected region A. In other words, when an operation of enclosing an arbitrary region is performed by sequential instruction inputs on the touch panel 10 by a user, the selected region A is recognized by the recognition unit 12 based on the trajectory T of the position information.

Note that the determination as to whether the closed region or the enclosed region is formed based on the trajectory of the sequential position information can be made by applying a known character recognition technique or the like, for example. In the known character recognition technique, the open source library which is known to those skilled in the art or the like is used, for example. Further, this technique can determine by which of the clockwise and counterclockwise trajectories the closed region or the enclosed region is formed.

The determination unit 13 is a part that determines to zoom in or out the image displayed in the display area 10*a* of the touch panel 10 and the details of zooming in or out based on the range of the selected region A that is recognized by the recognition unit 12. Further, the display control unit 14 is a part that zooms in or out the image displayed in the display area 10*a* based on the details determined by the determination unit 13 and displays it in the display area 10*a* of the touch panel 10.

It should be noted that the zoom in and out of an image in this embodiment is performed based on sequential instruction inputs on the touch panel 10 by a user, and such an instruction input is used also for an instruction for performing scrolling of the image displayed in the display area 10*a*, for example. Thus, in order to make a distinction between the instruction inputs for those processing, the determination unit 13 may determine to zoom in or out the image displayed in the display area 10a when the moving speed of the position of an instruction input received by the input unit 10b is a specified speed or higher. To be specific, when the acquisition unit 11 acquires the position information P, it further acquires the input time when an instruction input is made in addition to the coordinate value. Then, the determination unit 13 calculates the moving speed of the position of the instruction input from a user based on the coordinate value and the input time contained in the position information P, and performs scrolling of the image when the moving speed is lower than a specified value and performs zooming in or out the image when the moving speed is a specified value or higher.

Figure 5:
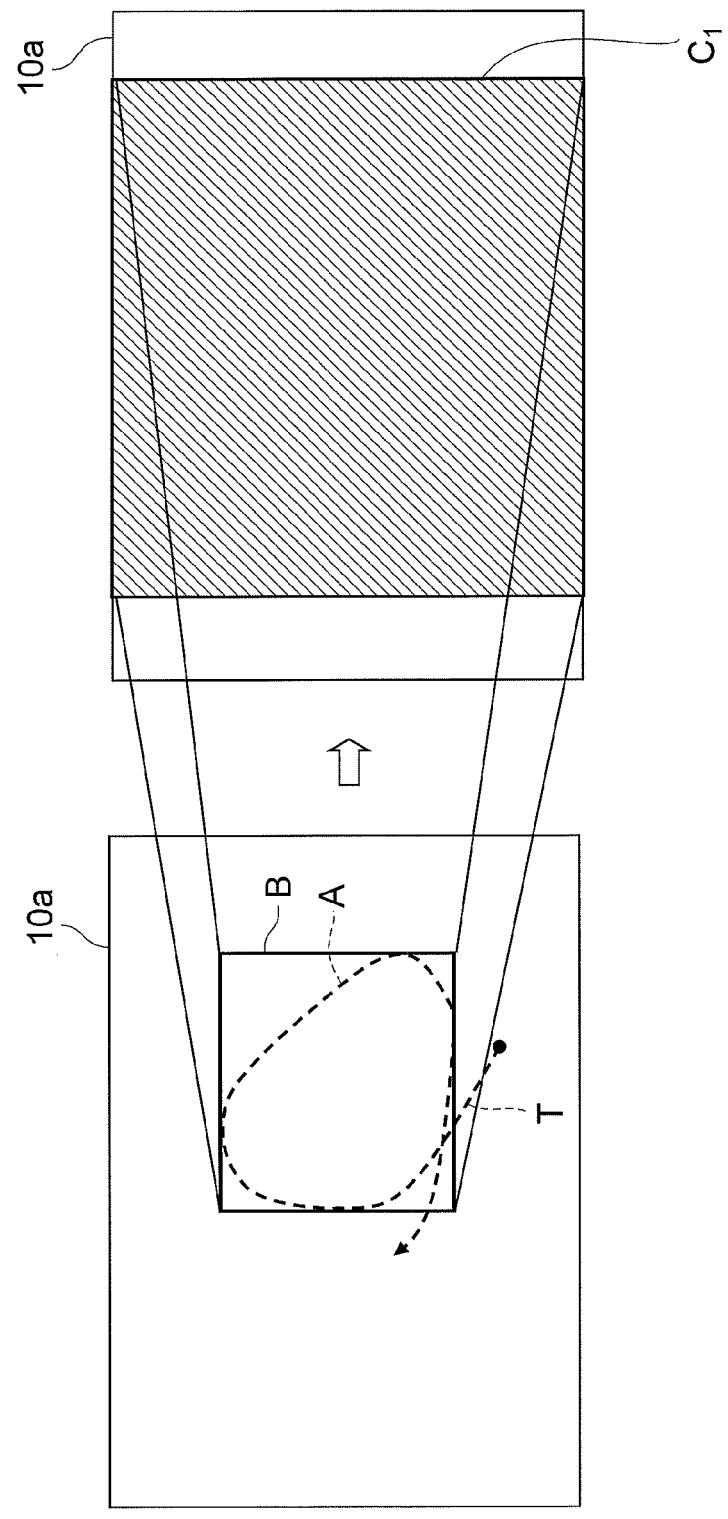
FIG. 5 is a diagram showing an example of processing of zooming in an image displayed in a display area.

First, an example of zooming in the image displayed in the display area 10a is specifically described with reference to FIG. 5. FIG. 5 is a diagram illustrating the processing of zooming in the image displayed in the display area 10a. As shown in FIG. 5, the determination unit 13 determines the zoom-in ratio of an image that is displayed in the display area 10a based on the position and the size of the selected region A and the size of the display area 10a. To be specific, the determination unit 13 sets a rectangular region B circumscribing the selected region A. Then, the determination unit 13 determines the zoom-in ratio based on the size of the rectangular region B and the size of the display area 10a.

The determination unit 13 can set the largest zoom-in ratio that allows the image included in the rectangular region B to be displayed in the display area 10a so that the image included in the rectangular region B does not extend off the display area 10a, for example, as the zoom-in ratio of the image displayed in the display area 10a. In this case, the image included in the rectangular region B is displayed zoomed in to the size indicated by the region $C_1$. Then, the display control unit 14 zooms in the image included in the rectangular region B with the zoom-in ratio determined by the determination unit 13 and displays the zoomed-in image in the display area 10a so that the center of the zoomed-in image and the center of the display area 10a coincide with each other.

Note that, although the rectangular region B circumscribes the selected region A in the example of FIG. 5, the determination unit 13 may set a rectangular region that is inscribed in the selected region A. The aspect ratio of the rectangular region that is set in this case may be the same as the aspect ratio of the display area 10a.

Further, the determination unit 13 may set a rectangular region that mostly includes the area of the selected region A. In this case, the determination unit 13 may set a rectangular region that includes 80% or more of the area of the selected region A, for example.

An example of determining the zoom-in ratio by the determination unit 13 is specifically described with reference to FIG. 6. A method of determining the zoom-in ratio, however, is not limited to the example described with reference to FIG. 6.

Figure 6:
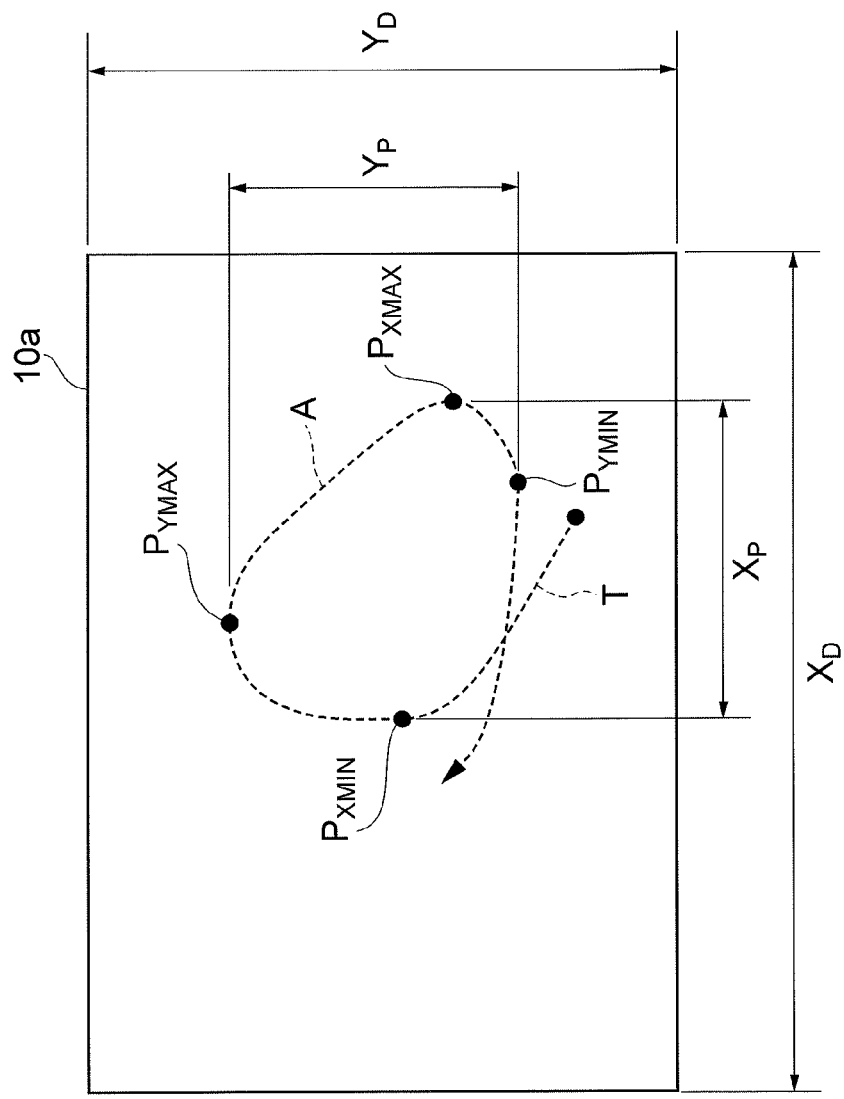
FIG. 6 is a diagram showing an example of determination of a zoom-in ratio by a determination unit.

As shown in FIG. 6, the determination unit 13 extracts position information $P_{XMAX}$ with the maximum coordinate value in the x-axis direction and position information $P_{XMIN}$ with the minimum coordinate value in the x-axis direction among a plurality of position information that form the outer edge of the selected region A and calculates a difference value between the x-coordinate value of the position information $P_{XMAX}$ and the x-coordinate value of the position information $P_{XMIN}$ as a size $X_P$ of the selected region A in the x-axis direction. Likewise, the determination unit 13 extracts position information $P_{YMAX}$ with the maximum coordinate value in the y-axis direction and position information $P_{YMIN}$ with the minimum coordinate value in the y-axis direction among a plurality of position information that form the outer edge of the selected region A and calculates a difference value between the y-coordinate value of the position information $P_{YMAX}$ and the y-coordinate value of the position information $P_{YMIN}$ as a size $Y_P$ of the selected region A in the y-axis direction.

Then, the determination unit 13 determines the zoom-in ratio based on the ratio ($X_D/X_P$) of the size $X_D$ of the display area 10a in the x-axis direction to the size $X_P$ of the selected region A in the x-axis direction or the ratio ($Y_D/Y_P$) of the size $Y_D$ of the display area 10a in the y-axis direction to the size $Y_P$ of the selected region A in the y-axis direction.

For example, the determination unit 13 may use the smaller one of the ratio ($X_D/X_P$) and the ratio ($Y_D/Y_P$) as the zoom-in ratio. In this case, the largest zoom-in ratio that allows displaying the whole image in the selected region A without lack is used. Note that, in the example of determining the zoom-in ratio described with reference to FIG. 6, the setting of the rectangular region B is not required.

Further, in the case where the enclosed region that is specified based on the trajectory of a set of time-series position information is recognized as the selected region by the recognition unit 12, the determination unit 13 may determine to zoom in the image displayed on the display screen with a predetermined specified zoom-in ratio. In this case, the determination unit 13 determines the details of zooming in based on the position of the selected region. To be specific, the determination unit 13 determines a reference position in the image displayed on the display screen based on the position of the selected region, and determines to put the reference position at the specified position on the display screen at the time of zooming in. For example, the determination unit 13 sets the center-of-gravity position of the selected position or the center position of the rectangular region that is set based on the selected region by the above-described method as the reference position. Then, the determination unit 13 can determine to zoom in the image displayed on the display screen, putting the reference position at the center position on the display screen. Note that the specified zoom-in ratio may be set arbitrarily, such as a value of 110%, for example.

Figure 7:
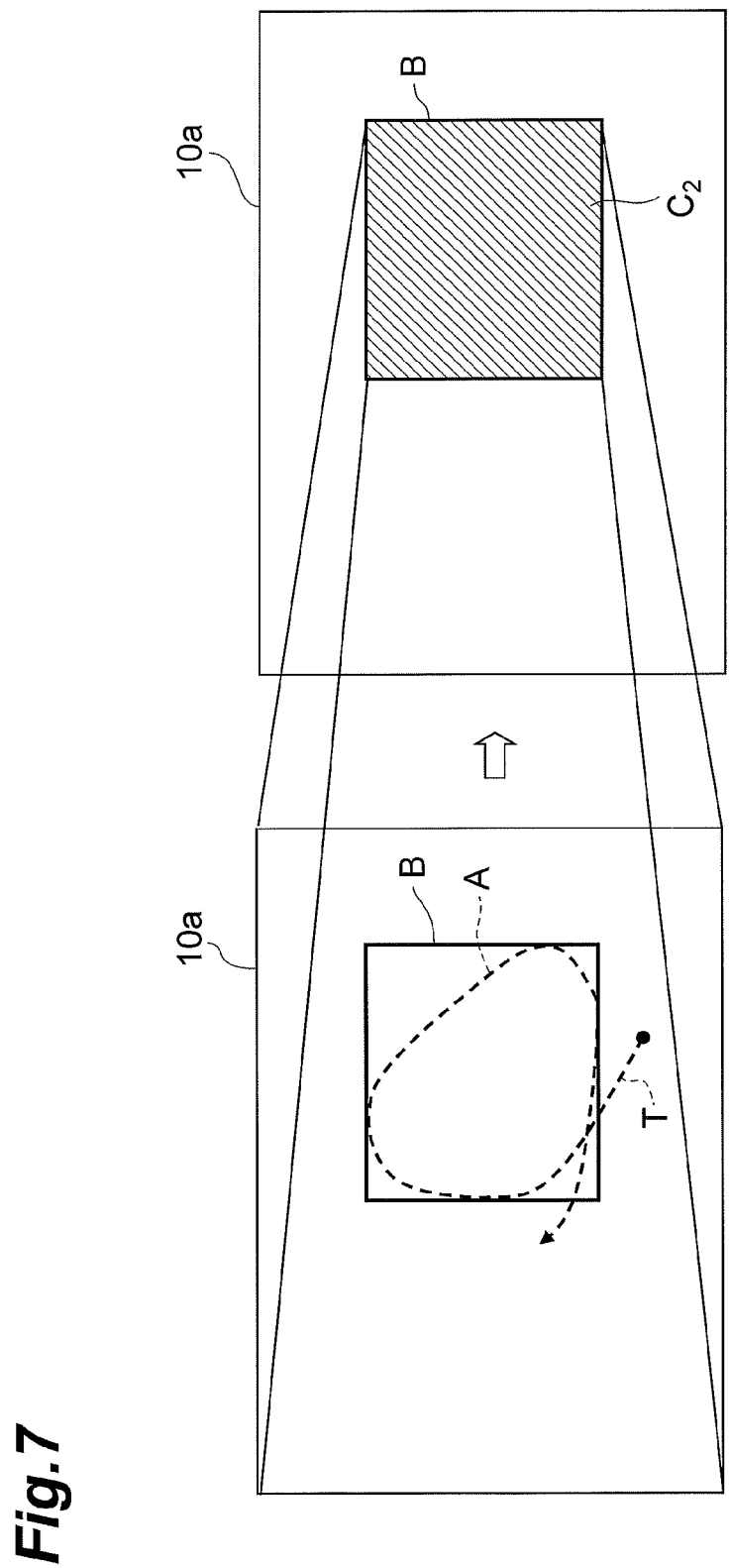
FIG. 7 is a diagram showing an example of processing of zooming out an image displayed in a display area.

Next, an example of zooming out the image displayed in the display area 10a is specifically described with reference to FIG. 7. FIG. 7 is a diagram illustrating the processing of zooming out the image displayed in the display area 10a. As shown in FIG. 7, the determination unit 13 determines the zoom-out ratio of an image that is displayed in the display area 10a based on the position and the size of the selected region A and the size of the display area 10a. To be specific, the determination unit 13 sets a rectangular region B circumscribing the selected region A. Then, the determination unit 13 determines the zoom-out ratio based on the size of the rectangular region B and the size of the display area 10a.

The determination unit 13 can set the zoom-out ratio that allows the image displayed in the display area 10a to be displayed within the rectangular region B circumscribing the selected region A, for example, as the zoom-out ratio of the image displayed in the display area 10a. In this case, the image displayed in the display area 10a is displayed zoomed out to the size indicated by the region $C_2$. Then, the display control unit 14 zooms out an image that at least includes the image displayed in the display area 10a with the zoom-out ratio determined by the determination unit 13 and displays the zoomed-out image in the display area 10a so that the center of the zoomed-out image and the center of the selected region A or the rectangular region B coincide with each other. Accordingly, the image displayed in the display area 10a before zoom out is displayed zoomed out into the rectangular region B, and therefore the image that is displayed in the display area 10a after zoom out is an image that partly includes the image displayed in the display area 10a before zoom out. For example, when the image displayed in the display area 10a before zoom out is an image obtained by cutting out a part of the image to be displayed, an image that extends outside a part of the area in the image to be displayed may be displayed zoomed out in an area outside the rectangular region B in the display area 10a after zoom out.

Note that, although the rectangular region B circumscribes the selected region A in the example of FIG. 7, the determination unit 13 may set a rectangular region that is inscribed in the selected region A. The aspect ratio of the rectangular region that is set in this case may be the same as the aspect ratio of the display area 10a.

Further, the determination unit 13 may determine the zoom-out ratio by setting a rectangular region that mostly includes the area of the selected region A. In this case, the determination unit 13 may set a rectangular region that includes 80% or more of the area of the selected region A, for example.

An example of determining the zoom-out ratio by the determination unit 13 is specifically described with reference back to FIG. 6. A method of determining the zoom-out ratio, however, is not limited to the example described with reference to FIG. 6.

As shown in FIG. 6, the determination unit 13 extracts position information $P_{XMAX}$ with the maximum coordinate value in the x-axis direction and position information $P_{XMIN}$ with the minimum coordinate value in the x-axis direction among a plurality of position information that form the outer edge of the selected region A and calculates a difference value between the x-coordinate value of the position information $P_{XMAX}$ and the x-coordinate value of the position information $P_{XMIN}$ as a size $X_P$ of the selected region A in the x-axis direction. Likewise, the determination unit 13 extracts position information $P_{YMAX}$ with the maximum coordinate value in the y-axis direction and position information $P_{YMIN}$ with the minimum coordinate value in the y-axis direction among a plurality of position information that form the outer edge of the selected region A and calculates a difference value between the y-coordinate value of the position information $P_{YMAX}$ and the y-coordinate value of the position information $P_{YMIN}$ as a size $Y_P$ of the selected region A in the y-axis direction.

Then, the determination unit 13 determines the zoom-out ratio based on the ratio $(X_P/X_D)$ of the size $X_P$ of the selected region A in the x-axis direction to the size $X_D$ of the display area 10a in the x-axis direction or the ratio $(Y_P/Y_D)$ of the size $Y_P$ of the selected region A in the y-axis direction to the size $Y_D$ of the display area 10a in the y-axis direction.

For example, the determination unit 13 may use the smaller one of the ratio $(X_P/X_D)$ and the ratio $(Y_P/Y_D)$ as the zoom-out ratio. In this case, the whole image in the selected region A can be displayed within the rectangular region B. Note that, in the example of determining the zoom-out ratio described with reference to FIG. 6, the setting of the rectangular region B is not required.

Further, in the case where the enclosed region that is specified based on the trajectory of a set of time-series position information is recognized as the selected region by the recognition unit 12, the determination unit 13 may determine to zoom out the image displayed on the display screen with a predetermined specified zoom-out ratio. In this case, the determination unit 13 determines the details of zooming out based on the position of the selected region. To be specific, the determination unit 13 determines a reference position in the image displayed on the display screen based on the position of the selected region, and determines to put the reference position at the specified position on the display screen at the time of zooming out. For example, the determination unit 13 sets the center-of-gravity position of the selected position or the center position of the rectangular region that is set based on the selected region by the above-described method as the reference position. Then, the determination unit 13 can determine to zoom out the image displayed on the display screen, putting the reference position at the center position on the display screen. Note that the specified zoom-out ratio may be set arbitrarily, such as a value of 90%, for example.

An example of recognition of the selected region by the recognition unit 12 is described hereinafter with reference to FIG. 8. When a closed region is formed by the trajectory T of the position information P, the recognition unit 12 specifies the closed region as the enclosed region and recognizes the enclosed region as the selected region A; however, even when a closed region is not formed by the trajectory T of the position information P, if the trajectory T of the position information P satisfies specified conditions, the recognition unit 12 may specify the enclosed region by assuming that the trajectory of position information exists between the starting point and the end point of the trajectory of the position information P, and thereby recognize the selected region.

Figure 8:
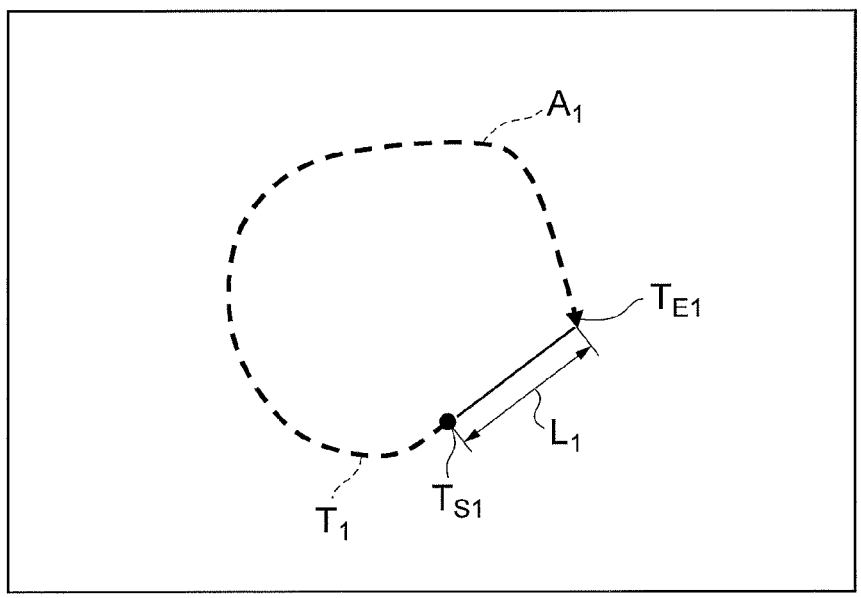
FIG. 8 is a diagram showing an example of recognition of a selected region by a recognition unit.

In the example of FIG. 8, the trajectory $T_1$ of position information reaches the end point $T_{E1}$ without any intersection from the starting point $T_{S1}$, and thus a closed region is not formed by the trajectory $T_1$. In this case also, when specified conditions such as that a distance $L_1$ between the starting point $T_{S1}$ and the end point $T_{E1}$ is a specified distance or less, or when the ratio of the distance $L_1$ between the starting point $T_{S1}$ and the end point $T_{E1}$ to the length of the trajectory $T_1$ is a specified ratio or less are satisfied, the recognition unit 12 can specify the enclosed region by assuming that the trajectory of position information exists between the starting point $T_{S1}$ and the end point $T_{E1}$ of the trajectory $T_1$. Then, the recognition unit 12 can set the selected region $A_1$ based on the specified enclosed region.

Further, when the center-of-gravity point of a region enclosed by a line connecting the trajectory $T_1$ and the points $T_{E1}$ and $T_{S1}$ is calculated, and an angle between a line connecting the point $T_{E1}$ and the center-of-gravity point and a line connecting the point $T_{S1}$ and the center-of-gravity point is a specified angle or less, the recognition unit 12 may specify the selected region $A_1$ by assuming that the trajectory of position information exists between the starting point $T_{S1}$ and the end point $T_{E1}$ of the trajectory $T_1$.

Figure 9:
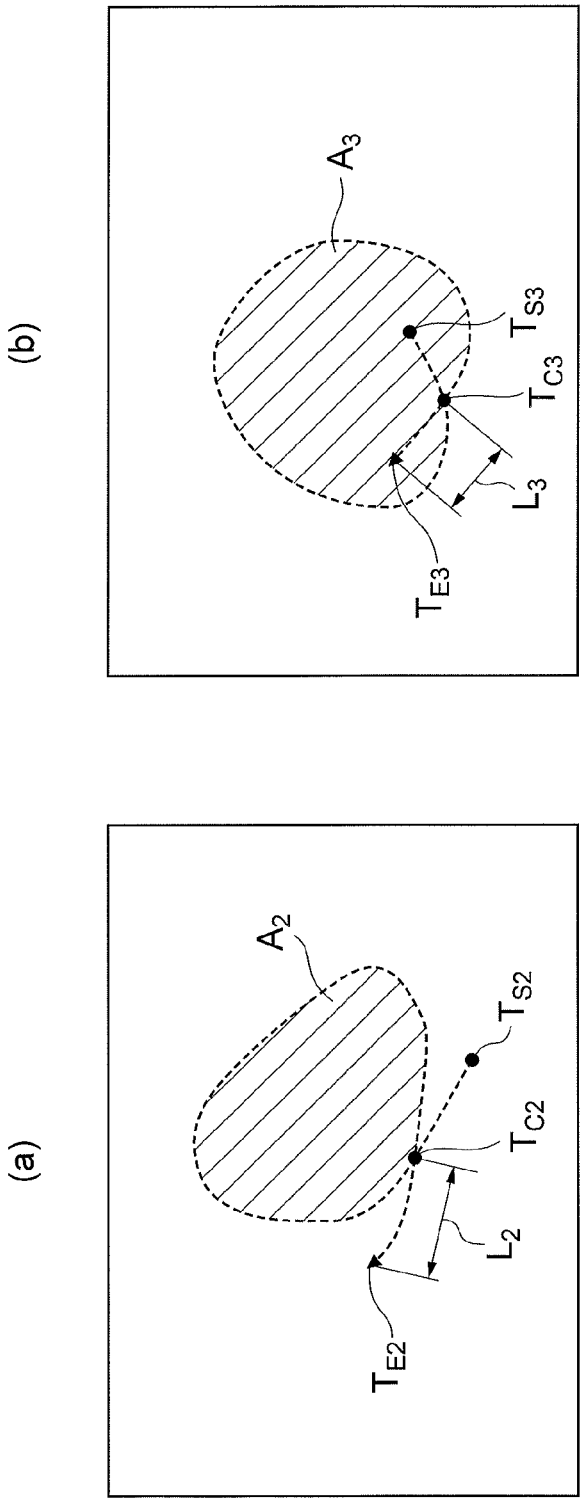
FIG. 9 is a diagram showing an example of adjustment of a zoom-in ratio and a zoom-out ratio of an image to be displayed in a display area.

Adjustment of the zoom-in ratio and the zoom-out ratio of the image displayed in the display area 10a is described hereinafter with reference to FIG. 9. When the position information P based on sequential instruction inputs is additionally acquired by the acquisition unit 11 after the enclosed region is specified based on the closed region formed by the trajectory T of the position information P, the recognition unit 12 acquires the trajectory of the position information P received after forming the closed region, and the determination unit 13 adjusts the zoom-in ratio or the zoom-out ratio of the image displayed in the display area 10a based on the position and the length of the trajectory of the position information received after forming the closed region which is acquired by the recognition unit 12.

To be specific, as shown in FIG. 9(a), when the trajectory T of the position information P extends from the starting point $T_{S2}$ to the point $T_{C2}$ and thereby the closed region is formed and the selected region $A_2$ is recognized and, after that, the position information P based on sequential instruction inputs is additionally acquired by the acquisition unit 11, the recognition unit 12 acquires the trajectory of the position information P extending from the point $T_{C2}$ to the end point $T_{E2}$. In this case, the determination unit 13 can adjust the zoom-in ratio or the zoom-out ratio of the image displayed in the display area 10a based on the position and the length $L_2$ of the trajectory of the position information P extending from the point $T_{C2}$ to the end point $T_{E2}$.

For example, when the trajectory of the position information P from the point $T_{C2}$ to the end point $T_{E2}$ extends outside the closed region $A_2$ as shown in FIG. 9(a), the determination unit 13 may make adjustment to increase the zoom-in ratio or the zoom-out ratio of the image displayed on the display screen. In this case, the determination unit 13 can set the amount of increase in the zoom-in ratio or the zoom-out ratio arbitrarily in accordance with the length $L_2$.

Further, as shown in FIG. 9(b), when the trajectory T of the position information P extends from the starting point $T_{S3}$ to the point $T_{C3}$ and thereby the closed region is formed and the selected region $A_3$ is recognized and, after that, the position information P based on sequential instruction inputs is additionally acquired by the acquisition unit 11, the recognition unit 12 acquires the trajectory of the position information P that extends from the point $T_{C3}$ to the end point $T_{E3}$. In this case, the determination unit 13 can adjust the zoom-in ratio or the zoom-out ratio of the image displayed in the display area 10a based on the position and the length $L_3$ of the trajectory of the position information P extending from the point $T_{C3}$ to the end point $T_{E3}$. In the example shown in FIG. 9(b), because the trajectory of the position information P from the point $T_{C3}$ to the end point $T_{E3}$ extends inside the closed region $A_3$, the determination unit 13 makes adjustment to decrease the zoom-in ratio or the zoom-out ratio of the image displayed on the display screen. In this case, the determination unit 13 can set the amount of decrease in the zoom-in ratio or the zoom-out ratio arbitrarily in accordance with the length $L_3$.

Note that, although the zoom-in ratio or the zoom-out ratio is increased when the trajectory of the position information P from the point $T_{C2}$ to the end point $T_{E2}$ extends outside the closed region $A_2$ as shown in FIG. 9(a), and the zoom-in ratio or the zoom-out ratio is decreased when the trajectory of the position information P from the point $T_{C3}$ to the end point $T_{E3}$ extends inside the closed region $A_3$ as shown in FIG. 9(b) in the above description, it is not limited thereto. For example, the zoom-in ratio or the zoom-out ratio may be decreased when the trajectory of the position information P from the point $T_{C2}$ to the end point $T_{E2}$ extends outside the closed region $A_2$, and the zoom-in ratio or the zoom-out ratio may be increased when the trajectory of the position information P from the point $T_{C3}$ to the end point $T_{E3}$ extends inside the closed region $A_3$.

Figure 10:
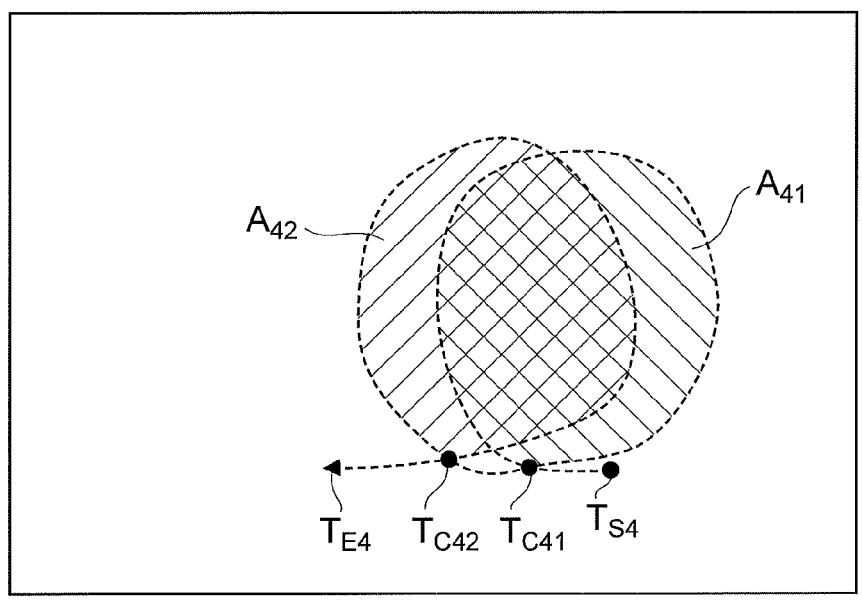
FIG. 10 is a diagram showing an example of change of a zoom-in ratio or a zoom-out ratio by a determination nit.

An example of changing the zoom-in ratio or the zoom-out ratio by the determination unit 13 is described hereinafter with reference to FIG. 10. When one or more enclosed regions are additionally specified by the trajectory T of the position information P that is received after specifying the enclosed region, the determination unit 13 can change the zoom-in ratio or the zoom-out ratio of the image displayed in the display area 10a in accordance with the number of additionally formed enclosed regions.

To be specific, when the trajectory T of the position information P extends from the starting point $T_{S4}$ to the end point $T_{C41}$ and thereby the closed region $A_{41}$ is formed and, after that, the trajectory T of the position information P further extends to the end point $T_{C42}$ and thereby the closed region $A_{42}$ is formed, the determination unit 13 can change the zoom-in ratio or the zoom-out ratio in accordance with the number of closed regions formed after the formation of the closed region $A_{41}$ is recognized. For example, the determination unit 13 may increase or decrease the previously set zoom-in ratio or zoom-out ratio by 10% each time a closed region is formed.

Figure 11:
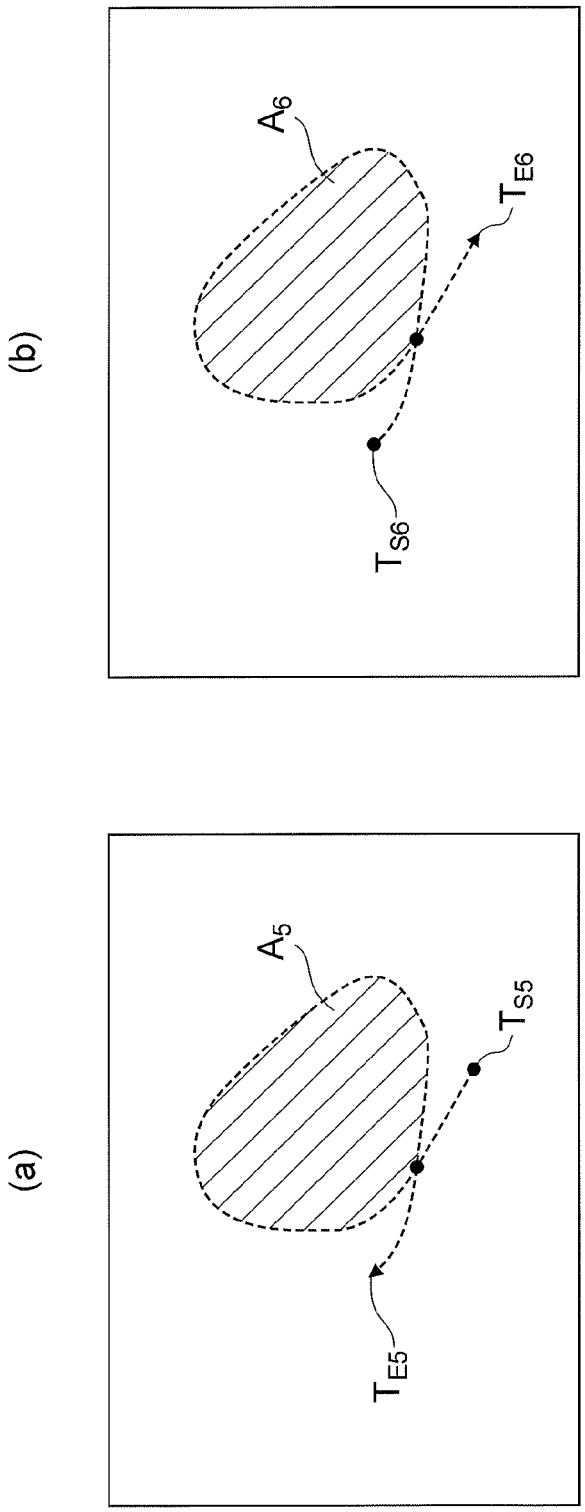
FIG. 11 is a diagram showing an example of control for determining which of zoom in and zoom out is to be performed on an image displayed in a display area.

Control for determining which of zoom in and zoom out is to be performed on the image displayed in the display area 10a is described hereinafter with reference to FIG. 11. As shown in FIG. 11(a), when the enclosed region $A_5$ is specified by the clockwise trajectory T that extends from the point $T_{S5}$ to the end point $T_{E5}$, the determination unit 13 can determine to zoom in the image displayed in the display area 10a. On the other hand, as shown in FIG. 11(b), when the enclosed region $A_6$ is specified by the counterclockwise trajectory T that extends from the point $T_{S6}$ to the end point $T_{E6}$, the determination unit 13 can determine to zoom out the image displayed in the display area 10a. Note that the determination unit 13 may determine to zoom out the image displayed in the display area 10a when the enclosed region is formed by the clockwise trajectory of position information and determine to zoom in the image displayed in the display area 10a when the enclosed region is formed by the counterclockwise trajectory of position information.

Note that, as described above, the determination as to whether the enclosed region is formed based on the trajectory of position information may be made by applying a known character recognition technique or the like, for example. In the known character recognition technique, the open source library which is known to those skilled in the art or the like is used, for example. Further, in such a technique, it can be determined by which of the clockwise and counterclockwise trajectories the closed region or the enclosed region is formed. Furthermore, when the closed region or the enclosed region is formed by the character recognition technique using the open source library or the like, the recognition unit 12 can determine by which of the clockwise and counterclockwise trajectories the enclosed region is formed based on a change in the slope of the vector connecting the two position information acquired sequentially in a time series, for example.

Figure 12:
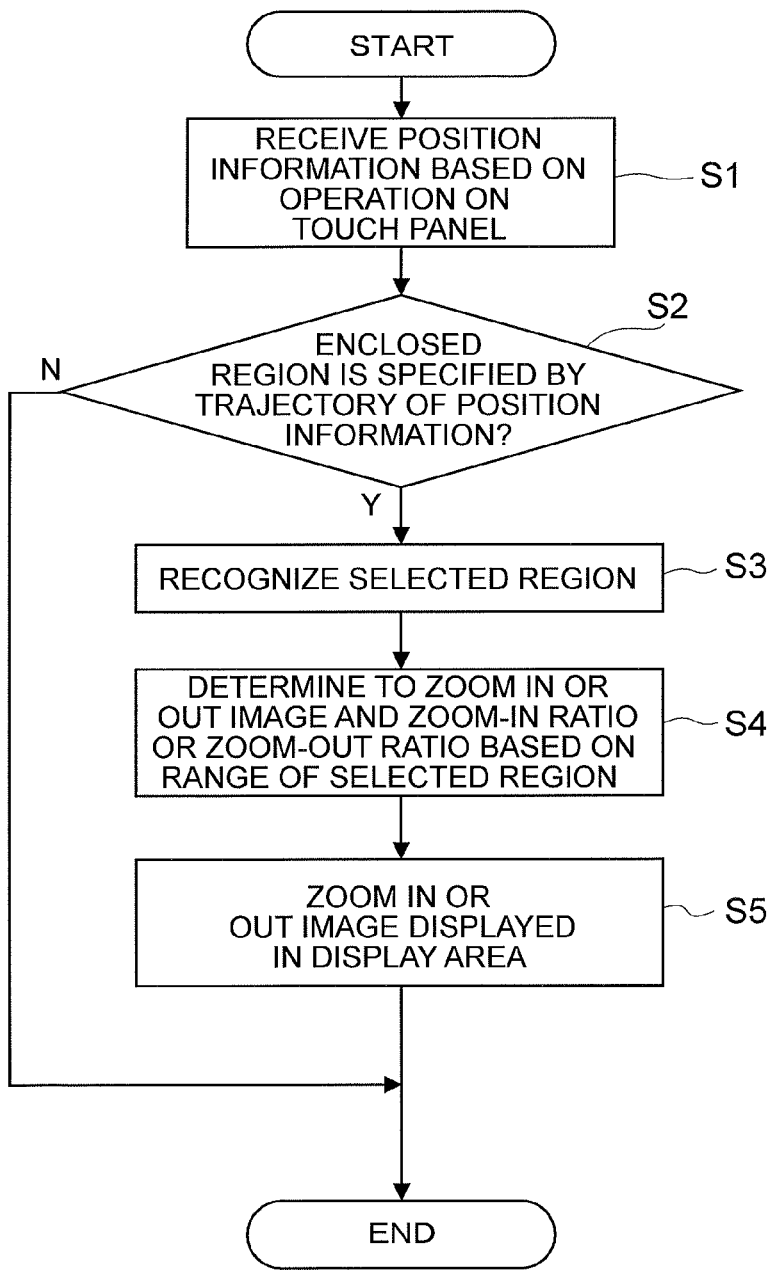
FIG. 12 is a flowchart showing a process in an image display device.

The operation of the image display device 1 according to this embodiment is described hereinafter with reference to FIG. 12. FIG. 2 is a flowchart showing a process of an image display method that is performed in the image display device 1.

First, the acquisition unit 11 receives position information indicating the position of an instruction input received by the input unit 10b of the touch panel 10 (S1). Next, the recognition unit 12 determines whether an enclosed region is specified by the trajectory of the position information received by the acquisition unit 11 based on sequential instruction inputs through the input unit 10b (S2). When it is determined that an enclosed region is specified, the process proceeds to Step S3. On the other hand, when it is not determined that an enclosed region is specified, the process ends.

In Step S3, the recognition unit 12 recognizes the enclosed region specified in Step S2 as a selected region (S3). Then, the determination unit 13 determines to zoom in or out the image displayed in the display area 10a of the touch panel 10 and the details of zooming in including the zoom-in ratio or the details of zooming out including the zoom-out ratio based on the range of the selected region A that is recognized by the recognition unit 12 (S4). After that, the display control unit 14 zooms in or out the image displayed in the display area 10a based on the details of zooming in or out determined by the determination unit 13 and displays it in the display area 10a of the touch panel 10 (S5).

Figure 13:
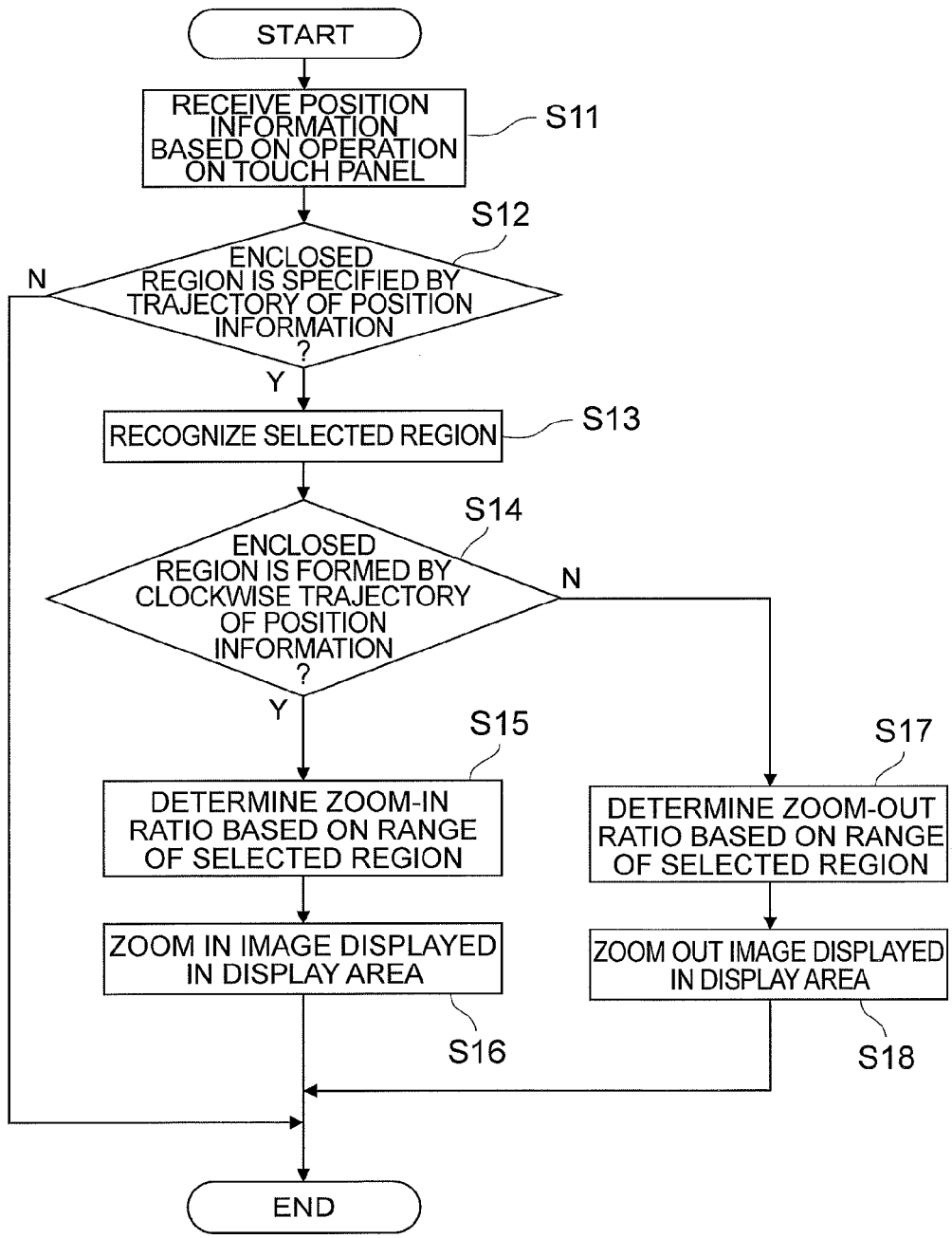
FIG. 13 is a flowchart showing a process in an image display device.

Another example of a process of an image display method that is performed in the in the image display device 1 is described hereinafter with reference to FIG. 13. The processing of Steps S11 to S13 is the same as the processing of Steps S1 to S3 in FIG. 12. In the following Step S14, the determination unit 13 determines whether the enclosed region is formed by the clockwise trajectory of position information or not (S 14). When it is determined that it is formed by the clockwise trajectory of position information, the process proceeds to Step S15. On the other hand, when it is not determined that it is formed by the clockwise trajectory of position information, the process proceeds to Step S16.

In Step S15, the determination unit 13 determines the details of zooming in the image displayed in the display area 10a of the touch panel 10, including the zoom-in ratio, based on the range of the selected region A that is recognized by the recognition unit 12 (S15). After that, the display control unit 14 zooms in the image displayed in the display area 10a based on the zoom-in ratio and the details of zooming in determined by the determination unit 13 and displays it in the display area 10a of the touch panel 10 (S16).

On the other hand, in Step S17, the determination unit 13 determines the details of zooming out the image displayed in the display area 10a of the touch panel 10, including the zoom-out ratio, based on the range of the selected region A that is recognized by the recognition unit 12 (S17). After that, the display control unit 14 zooms out the image displayed in the display area 10a based on the zoom-out ratio and the details of zooming out determined by the determination unit 13 and displays it in the display area 10a of the touch panel 10 (S18).

Figure 14:
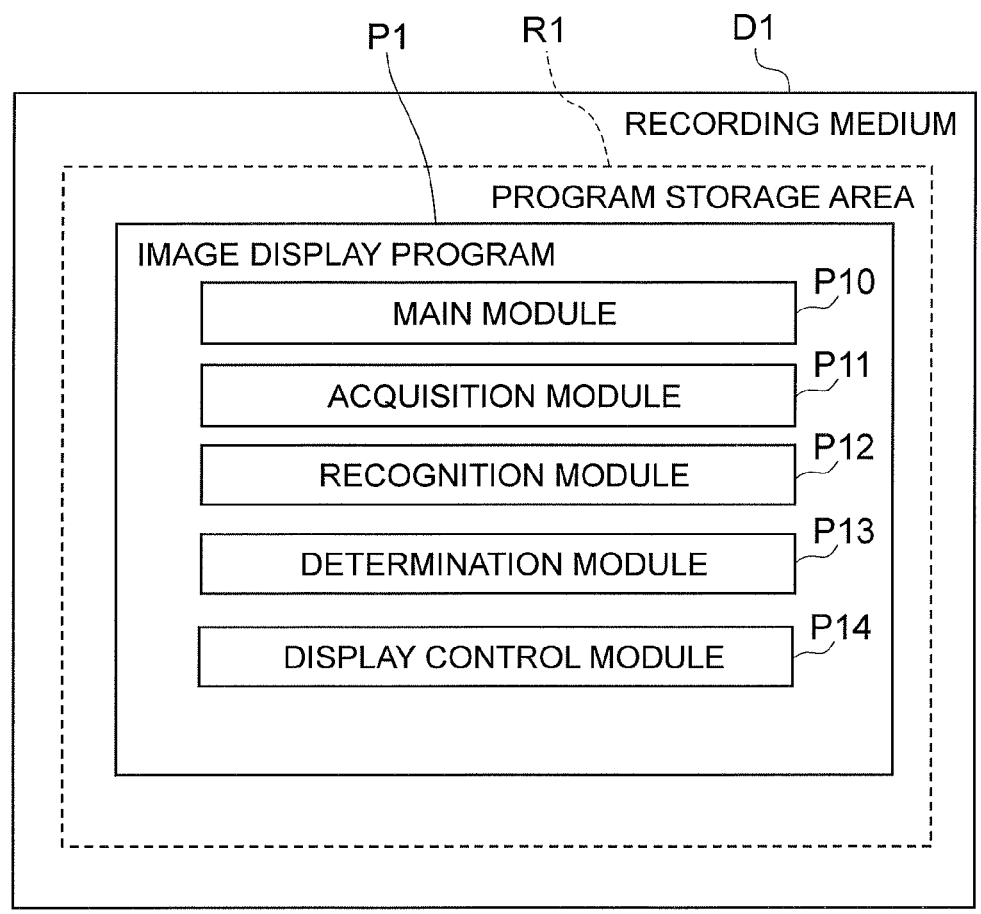
FIG. 14 is a diagram showing a configuration of an image display program.

An image display program that causes a computer to function as the image display device 1 is described hereinafter with reference to FIG. 14. An image display program P1 includes a main module P10, an acquisition module P11, a recognition module P12, a determination module P13 and a display control unit P14.

The main module P10 is a part that exercises control over the image display process. The functions implemented by the acquisition module P11, the recognition module P12, the determination module P13 and the display control unit P14 are equal to the functions of the acquisition unit 11, the recognition unit 12, the determination unit 13 and the display control unit 14 of the image display device 1 shown in FIG. 1, respectively.

The image display program P1 is provided through a storage medium D1 such as CD-ROM or DVD-ROM or semiconductor memory, for example. Further, the image display program P1 may be provided as a computer data signal superimposed onto a carrier wave over a communication network.

According to the image display device 1, the image display method and the image display program P1 described above, when, in response to sequential instruction inputs by a user, an operation of enclosing an arbitrary region on a display screen with the trajectory of positions indicated by those instruction inputs is performed, position information indicating the positions indicated by those instruction inputs is acquired. Then, an enclosed region that is specified by the trajectory of the acquired position information is recognized as a selected region, and an image displayed in an image display area is zoomed in with the zoom-in ratio that is determined based on the range of the selected region and the range of the image display area. Further, the transformed image that is zoomed in is displayed with the center of the transformed image and the center of the image display area aligned with each other. Thus, because the image is zoomed in based on a user's operation of enclosing an arbitrary region on the display screen, the area to be zoomed in within the image can be selected in an intuitive manner.

Further, because processing that is performed during receiving instruction inputs is only the processing of acquiring position information and thus sequential heavy-load computation is not required, a zoom-in display process can be achieved with a light processing load.

Hereinbefore, the present invention has been described in detail with respect to the embodiment thereof. However, the present invention is not limited to the above-described embodiment. Various changes and modifications may be made therein without departing from the scope of the invention.

INDUSTRIAL APPLICABILITY

As described above, according to this embodiment, there is provided an image display device that can display an image zoomed in and out, allowing a user to intuitively recognize the zoom in and out of the image with a light processing load.

REFERENCE SIGNS LIST

1 . . . image display device, 10 . . . touch panel, 10a . . . display area, 10b . . . input unit, 11 . . . acquisition unit, 12 . . . recognition unit, 13 . . . determination unit, 14 . . . display control unit, D1 . . . storage medium, P1 . . . image display program, P10 . . . main module, P11 . . . acquisition module, P12 . . . recognition module, P13 . . . determination module, P14 . . . display control module

The invention claimed is:

1. An image display device including a display unit configured to display an image in an image display area on a display screen and an input unit configured to receive an instruction input indicating a position on the display screen, comprising:
   at least one processor operable to read and operate according to instructions within a computer program; and
   at least one memory operable to store at least portions of said computer program for access by said processor;
   wherein said program includes algorithms to cause said processor to implement:
   an acquisition unit configured to acquire position information indicating a position of an instruction input received by the input unit;
   a region recognition unit configured to specify an enclosed region in the image display area enclosed by a trajectory indicated by a set of position information received by the acquisition unit based on sequential instruction inputs through the input unit and recognize the enclosed region as a selected region;
   a direction specifying unit configured to specify a direction of the trajectory enclosing the enclosed region based on the trajectory of the position information received by the acquisition unit;
   a determination unit configured to determine a zoom-in ratio of an image displayed in the image display area when the direction specified by the direction specifying unit is a first direction, and determine a zoom-out ratio of an image displayed in the image display area when the direction specified by the direction specifying unit is a second direction opposite to the first direction, based on a range of the image display area and a range of the selected region recognized by the region recognition unit; and
   a display control unit configured to cause a zoomed-in image obtained by zooming in the image displayed in the image display area with the zoom-in ratio determined by the determination unit to be displayed in the image display area with a center of the zoomed-in image and a center of the image display area coinciding with each other when the direction specified by the direction specifying unit is the first direction, and causes a zoomed-out image obtained by zooming out an image at least partly including the image displayed in the image display area with the zoom-out ratio determined by the determination unit to be displayed in the image display area with a center of the zoomed-out image and a center of the image display area coinciding with each other when the direction specified by the direction specifying unit is the second direction, wherein when position information based on sequential instruction inputs following the sequential instruction inputs related to specifying the enclosed region is additionally acquired by the acquisition unit after specifying the enclosed region by the trajectory of the position information, the region recognition unit acquires a trajectory of the position information received after specifying the enclosed region, the determination unit adjusts the zoom-in ratio or the zoom-out ratio of the image displayed in the image display area based on a position and an amount of displacement of the trajectory of the position information received after specifying the enclosed region acquired by the region recognition unit, the amount of displacement being measured from a point at which the enclosed region is specified, the point being included in the trajectory, and a degree of the adjustment of the zoom-in ratio or the zoom-out ratio varies according to the amount of displacement of the trajectory of the position information received after specifying the enclosed region acquired by the region recognition unit, when the trajectory of the position information received after specifying the enclosed region extends inside the enclosed region in the same direction in which the enclosed region is specified, the determination unit adjusts the zoom-in ratio or the zoom-out ratio of the image displayed in the image display area by making a change being one of an increase and a decrease to the ratio, the change being based on a position and a length of the trajectory extended inside the enclosed region, and when the trajectory of the position information received after specifying the enclosed region extends outside the enclosed region in the same direction in which the enclosed region is specified, the determination unit adjusts the zoom-in ratio or the zoom-out ratio of the image displayed in the image display area by making a change being another one of an increase and a decrease to the ratio, the change being based on a position and a length of the trajectory extended outside the enclosed region.

2. The image display device according to claim 1, wherein the determination unit determines a largest zoom-in ratio allowing display of a whole image within a rectangular region circumscribing the selected region in the image display area as the zoom-in ratio of the image displayed in the image display area, and the display control unit causes the image included in the rectangular region to be zoomed in with the zoom-in ratio determined by the determination unit and displayed in the image display area.

3. The image display device according to claim 2, wherein the position information is represented by first and second coordinate values in a two-dimensional coordinate system having first and second coordinate axes orthogonal to each other in the image display area, and the determination unit calculates a difference value between the maximum first coordinate value and the minimum first coordinate value among a plurality of first coordinate values respectively included in a plurality of position information forming an outer edge of the selected region as a size of the selected region in a direction of the first coordinate axis, calculates a difference value between the maximum second coordinate value and the minimum second coordinate value among a plurality of second coordinate values as a size of the selected region in a direction of the second coordinate axis, and determines the zoom-in ratio based on a ratio of a size of the image display area in the direction of the first coordinate axis to the size of the selected region in the direction of the first coordinate axis or a ratio of a size of the image display area in the direction of the second coordinate axis to the size of the selected region in the direction of the second coordinate axis.

4. The image display device according to claim 1, wherein the determination unit determines a zoom-out ratio allowing display of the image displayed in the image display area within a rectangular region circumscribing the selected region as the zoom-out ratio of the image displayed in the image display area, and the display control unit causes an image at least partly including the image displayed in the image display area to be zoomed out with the zoom-out ratio determined by the determination unit and displayed within the rectangular region in the image display area.

5. The image display device according to claim 4, wherein the position information is represented by first and second coordinate values in a two-dimensional coordinate system having first and second coordinate axes orthogonal to each other in the image display area, and the determination unit calculates a difference value between the maximum first coordinate value and the minimum first coordinate value among a plurality of first coordinate values respectively included in a plurality of position information forming an outer edge of the selected region as a size of the selected region in a direction of the first coordinate axis, calculates a difference value between the maximum second coordinate value and the minimum second coordinate value among a plurality of second coordinate values as a size of the selected region in a direction of the second coordinate axis, and determines the zoom-out ratio based on a ratio of the size of the selected region in the direction of the first coordinate axis to a size of the image display area in the direction of the first coordinate axis or a ratio of the size of the selected region in the direction of the second coordinate axis to a size of the image display area in the direction of the second coordinate axis.

6. The image display device according to claim 1, wherein when the one or more enclosed regions are additionally specified by the trajectory of the position information received after specifying the enclosed region, the determination unit changes the zoom-in ratio or the zoom-out ratio of the image displayed in the image display area in accordance with the number of additionally specified enclosed regions.

7. The image display device according to claim 1, wherein when a moving speed of the position of the instruction input received by the input unit is a specified speed or higher, the determination unit determines to zoom in or out the image displayed in the image display area.

8. An image display method in an image display device including a display unit configured to display an image in an image display area on a display screen and an input unit configured to receive an instruction input indicating a position on the display screen, the method comprising:
an acquisition step of acquiring position information indicating a position of an instruction input received by the input unit;
a region recognition step of specifying an enclosed region in the image display area enclosed by a trajectory indicated by a set of position information received in the acquisition step based on sequential instruction inputs through the input unit and recognizing the enclosed region as a selected region;
a direction specifying step of specifying a direction of the trajectory enclosing the enclosed region based on the trajectory of the position information received in the acquisition step;
a determination step of determining a zoom-in ratio of an image displayed in the image display area when the direction specified in the direction specifying step is a first direction, and determining a zoom-out ratio of an image displayed in the image display area when the direction specified in the direction specifying step is a second direction opposite to the first direction, based on a range of the image display area and a range of the selected region recognized in the region recognition step; and
a display control step of causing a zoomed-in image obtained by zooming in the image displayed in the image display area with the zoom-in ratio determined in the determination step to be displayed in the image display area with a center of the zoomed-in image and a center of the image display area coinciding with each other when the direction specified in the direction specifying step is the first direction, and causing a zoomed-out image obtained by zooming out an image at least partly including the image displayed in the image display area with the zoom-out ratio determined in the determination step to be displayed in the image display area with a center of the zoomed-out image and a center of the image display area coinciding with each other when the direction specified in the direction specifying step is the second direction, wherein
when position information based on sequential instruction inputs following the sequential instruction inputs related to specifying the enclosed region is additionally acquired in the acquisition step after specifying the enclosed region by the trajectory of the position information, the region recognition step acquires a trajectory of the position information received after specifying the enclosed region,
the determination step adjusts the zoom-in ratio or the zoom-out ratio of the image displayed in the image display area based on a position and an amount of displacement of the trajectory of the position information received after specifying the enclosed region acquired in the region recognition step, the amount of displacement being measured from a point at which the enclosed region is specified, the point being included in the trajectory, and a degree of the adjustment of the zoom-in ratio or the zoom-out ratio varies according to a difference in the amount of displacement of the trajectory of the position information received after specifying the enclosed region acquired in the region recognition step,
when the trajectory of the position information received after specifying the enclosed region extends inside the enclosed region in the same direction in which the enclosed region is specified, the determination unit adjusts the zoom-in ratio or the zoom-out ratio of the image displayed in the image display area by making a change being one of an increase and a decrease to the ratio, the change being based on a position and a length of the trajectory extended inside the enclosed region, and
when the trajectory of the position information received after specifying the enclosed region extends outside the enclosed region in the same direction in which the enclosed region is specified, the determination unit adjusts the zoom-in ratio or the zoom-out ratio of the image displayed in the image display area by making a change being another one of an increase and a decrease to the ratio, the change being based on a position and a length of the trajectory extended outside the enclosed region.

9. An image display device including a display unit configured to display an image in an image display area on a display screen and an input unit configured to receive an instruction input indicating a position on the display screen, comprising:
at least one processor operable to read and operate according to instructions within a computer program; and
at least one memory operable to store at least portions of said computer program for access by said processor;
wherein said program includes algorithms to cause said processor to implement:
an acquisition unit configured to acquire position information indicating a position of an instruction input received by the input unit;
a region recognition unit configured to specify an enclosed region in the image display area enclosed by a trajectory indicated by a set of position information received by the acquisition unit based on sequential instruction inputs through the input unit and recognize the enclosed region as a selected region;
a direction specifying unit configured to specify a direction of the trajectory enclosing the enclosed region based on the trajectory of the position information received by the acquisition unit;
a determination unit configured to determine a zoom-in ratio of an image displayed in the image display area when the direction specified by the direction specifying unit is a first direction, and determine a zoom-out ratio of an image displayed in the image display area when the direction specified by the direction specifying unit is a second direction opposite to the first direction, based on a range of the image display area and a range of the selected region recognized by the region recognition unit; and
a display control unit configured to cause a zoomed-in image obtained by zooming in the image displayed in the image display area with the zoom-in ratio or the zoom-out ratio determined by the determination unit to be displayed in the image display area, wherein
when position information based on sequential instruction inputs following the sequential instruction inputs related to specifying the enclosed region is additionally acquired by the acquisition unit after specifying the enclosed region by the trajectory of the position information, the region recognition unit acquires a trajectory of the position information received after specifying the enclosed region, when the trajectory of the position information received after specifying the enclosed region extends inside the enclosed region in the same direction in which the enclosed region is specified, the determination unit adjusts the zoom-in ratio or the zoom-out ratio of the image displayed in the image display area by making a change being one of an increase and a decrease to the ratio, the change being based on a position and a length of the trajectory extended inside the enclosed region, and when the trajectory of the position information received after specifying the enclosed region extends outside the enclosed region in the same direction in which the enclosed region is specified, the determination unit adjusts the zoom-in ratio or the zoom-out ratio of the image displayed in the image display area by making a change being another one of an increase and a decrease to the ratio, the change being based on a position and a length of the trajectory extended outside the enclosed region.

* * * * *